(12) United States Patent
Grcevski et al.

(10) Patent No.: US 7,823,150 B2
(45) Date of Patent: Oct. 26, 2010

(54) COMPUTER-IMPLEMENTED METHOD, SYSTEM AND PROGRAM PRODUCT FOR ESTABLISHING MULTIPLE READ-ONLY LOCKS ON A SHARED DATA OBJECT

(75) Inventors: Nikola Grcevski, Toronto (CA); Kevin A. Stoodley, Richmond Hill (CA); Mark G. Stoodley, Thornhill (CA); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 1661 days.

(21) Appl. No.: 11/042,778

(22) Filed: Jan. 25, 2005

(65) Prior Publication Data

US 2006/0168585 A1    Jul. 27, 2006

(51) Int. Cl.
G06F 9/46 (2006.01)
(52) U.S. Cl. .......................................................... 718/1
(58) Field of Classification Search ....................... 718/1
See application file for complete search history.

(56) References Cited

U.S. PATENT DOCUMENTS

| | | | |
|---|---|---|---|
| 5,224,038 A * | 6/1993 | Bespalko | ..................... 715/234 |
| 5,490,270 A | 2/1996 | Devarakonda et al. | |
| 6,009,426 A | 12/1999 | Jouenne et al. | |
| 6,029,190 A | 2/2000 | Oliver | |
| 6,032,216 A | 2/2000 | Schmuck et al. | |
| 6,173,442 B1 | 1/2001 | Agesen et al. | |
| 6,192,408 B1 | 2/2001 | Vahalia et al. | |
| 6,735,760 B1 * | 5/2004 | Dice | ........................... 717/139 |
| 7,353,515 B1 * | 4/2008 | Ton et al. | ..................... 718/102 |
| 2002/0078119 A1 * | 6/2002 | Brenner et al. | .............. 709/102 |
| 2002/0138544 A1 * | 9/2002 | Long | ........................... 709/107 |
| 2002/0138706 A1 | 9/2002 | Hugly | |
| 2003/0217327 A1 * | 11/2003 | Ogasawara | .................. 714/798 |

* cited by examiner

*Primary Examiner*—Meng-Ai An
*Assistant Examiner*—Gregory A Kessler
(74) *Attorney, Agent, or Firm*—Patents On Demand, PA; Brian K. Buchheit; Scott M. Garrett (57) ABSTRACT

Under the present invention, a locking primitive associated with a shared data object is automatically transformed to allow multiple read-only locks if certain conditions are met. To this extent, when a read-only lock on a shared data object is desired, a thread identifier of an object header lock word (hereinafter "lock word") associated with the shared data object is examined to determine if a read-write lock on the shared data object already exists. If not, then the thread identifier is set to a predetermined value indicative of read-only locks, and a thread count in the lock word is incremented. If another thread attempts a read-only lock, the thread identifier will be examined for the predetermined value. If it is present, the thread count will be incremented again, and a second read-only lock will be simultaneously established.

24 Claims, 3 Drawing Sheets

(PRIOR ART)

FIG. 1

$t_{total}$ - Time spent reading the shared resource by the three read-only threads

FIG. 2

$t_{total}$ - Time spent reading the shared resource by the three read-only threads

COMPUTER-IMPLEMENTED METHOD, SYSTEM AND PROGRAM PRODUCT FOR ESTABLISHING MULTIPLE READ-ONLY LOCKS ON A SHARED DATA OBJECT

BACKGROUND OF THE INVENTION

1. Field of the Invention

In general, the present invention provides a computer-implemented method, system and program product for establishing multiple read-only locks on a shared data object. Specifically, the present invention allows a locking primitive for a shared data object to be automatically transformed to permit multiple read-only locks when certain conditions are met.

2. Related Art

A program which is executing using multiple threads requires synchronization points to ensure program correctness and proper operation, when two or more threads require access to shared data structures/objects. The synchronization is often achieved using locking primitives on a particular shared data object, where a single thread reserves exclusive access to the object at a given time. All other threads will wait to access the shared data object until the thread which has the access releases the lock, that is, stops using the shared data object in exclusive manner. After the thread releases the lock on the shared data object, the operating system will decide based on a particular algorithm which is the next thread that will be granted the exclusive access to the shared data object, if more than one thread is waiting on access to it. The synchronization points can be viewed as serialization primitives to ensure consistent values of the shared data object. The code fragment below, written in Java, presents two methods which are used to access a field in shared data object O, which is an instance of the class C, where they set and read the value of the field inside the object in thread safe manner:

```
class C {
    private int threadSafeField;
    public synchronized void set(int value) {
        threadSafeField = value;
    }
    public synchronized int get( ) {
        return threadSafeField;
    }
}
``` sample code fragment that uses the thread safe methods defined in the class C:

```
// in some method called foo( )
...
O.set(1);
...
// in some method called bar( )
...
int value = O.get( );
...
```

The thread safe code in applications can often suffer from performance problems if it is not designed properly. Namely, the purpose of using multiple threads is often performance driven, in such a way that, on multiprocessor systems multiple operations can be executed at the same time. In such cases, the synchronization points serve as serialization primitives where all of the threads, which normally execute in parallel, have to access the shared data objects in order. Therefore if not used properly they can cause complete serialization of the program execution, as if there weren't multiple threads executing, and the program cannot exploit the multiple processors, if they are present on the system. This is often described as a scalability problem of the application.

One technique to alleviate this problem is to implement multiple reader-single writer locks for regions of the code where it is known that multiple threads can access shared data without danger of making it inconsistent. In particular, an inconsistent state of a shared data object can exist only if multiple threads are writing to it, or if they are doing reads and writes at the same time. Conversely, it is generally safe for all threads to read the shared data object if no one thread is writing to it. To exploit this fact and to improve scalability of the program, programmers manually implement special locking logic at portions of the program code where they allow multiple threads to perform read-only operations of the data object, while properly synchronizing in case a write operation is performed. Unfortunately, implementing such logic under current practices often requires careful engineering and is usually a tedious process, especially where there isn't light-weight support for it in the programming language, as it is the case with Java.

In view of the foregoing, there exists a need for a computer-implemented method, system, and program product for establishing multiple read-only locks on a shared data objects. Specifically, a need exists whereby a locking primitive associated with a shared data object can be automatically transformed to permit multiple read-only locks.

SUMMARY OF THE INVENTION

In general, the present invention provides a computer-implemented method, system, and program product for establishing multiple read-only locks on shared data objects. Specifically, under the present invention, a locking primitive associated with a shared data object is automatically transformed to allow multiple read-only locks if certain conditions are met. To this extent, when a read-only lock on a shared data object is desired, a thread identifier of an object header lock word (hereinafter "lock word") associated with the shared data object is examined to determine if a read-write lock on the shared data object already exists. If not, then the thread identifier is set to a predetermined value indicative of read-only locks, and a thread count in the lock word is incremented. If another thread attempts a read-only lock, the thread identifier will be examined for the predetermined value. If it is present, the thread count will be incremented again, and a second read-only lock will be simultaneously established. Conversely, if a read-write lock is attempted while a read-only lock exists, the read-write lock will be denied and the lock will be inflated to a system lock.

A first aspect of the present invention provides a computer-implemented method for automatically transforming a locking primitive for a shared data object to permit multiple threads to simultaneously hold read-only locks, comprising: performing a field access analysis for the shared data object to determine whether a predetermined set of conditions are met; and automatically transforming the locking primitive for the shared data object to permit multiple threads to simultaneously hold a read-only lock on the shared data object if the set of predetermined conditions are met.

A second aspect of the invention provides a computer-implemented method for establishing multiple read-only locks on a shared data object, comprising: providing a lock word for a shared data object that includes a thread identifier field, a thread count field, flat lock contention field and a lock inflation field; examining the thread identifier field to determine if a read-write lock currently exists on the shared data object pursuant to an attempt by a first thread to obtain a read-only lock on the shared data object; and incrementing a thread count in the thread count field to establish a first read-only lock on the shared data object by the first thread if the read-write lock has not been established.

A third aspect of the invention provides a computerized system for establishing multiple read-only locks on a shared data object, comprising: an analysis system for examining a thread identifier in a thread identifier field of a lock word associated with the shared data object to determine if a read-write lock currently exists on the shared data object pursuant to an attempt by a first thread to obtain a read-only lock on the shared data object; a count system for incrementing a thread count in a thread count field of the lock word to establish a first read-only lock on the shared data object by the first thread if the read-write lock has not been established; and a thread identifier system for setting a thread identifier in the thread identifier field to a predetermined value indicative of read-only locks.

A fourth aspect of the present invention provides a program product stored on a recordable medium for establishing multiple read-only locks on a shared data object, which when executed, comprises: program code for examining a thread identifier in a thread identifier field of a lock word associated with the shared data object to determine if a read-write lock currently exists on the shared data object pursuant to an attempt by a first thread to obtain a read-only lock on the shared data object; program code for incrementing a thread count in a thread count field of the lock word to establish a first read-only lock on the shared data object by the first thread if the read-write lock has not been established; and program code for setting a thread identifier in the thread identifier field to a predetermined value indicative of read-only locks.

A fifth aspect of the present invention provides a method for deploying an application for establishing multiple read-only locks on a shared data object, comprising: providing a computer infrastructure being operable to: examine a thread identifier in a thread identifier field of a lock word associated with the shared data object to determine if a read-write lock currently exists on the shared data object pursuant to an attempt by a first thread to obtain a read-only lock on the shared data object; increment a thread count in a thread count field of the lock word to establish a first read-only lock on the shared data object by the first thread if the read-write lock has not been established; and set a thread identifier in the thread identifier field to a predetermined value indicative of read-only locks.

A sixth aspect of the present invention provides a computer software embodied in a propagated signal for establishing multiple read-only locks on a shared data object, the computer software comprising instructions to cause a computer system to perform the following functions: examine a thread identifier in a thread identifier field of a lock word associated with the shared data object to determine if a read-write lock currently exists on the shared data object pursuant to an attempt by a first thread to obtain a read-only lock on the shared data object; increment a thread count in a thread count field of the lock word to establish a first read-only lock on the shared data object by the first thread if the read-write lock has not been established; and set a thread identifier in the thread identifier field to a predetermined value indicative of read-only locks.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention will have the following Sections:

I. General Description
II. Illustrative Example
III. Computerized Implementation I. General Description As indicated above, the present invention provides a computer-implemented method, system, and program product for establishing multiple read-only locks on shared data objects. Specifically, under the present invention, a locking primitive associated with a shared data object is automatically transformed to allow multiple read-only locks if certain conditions are met. To this extent, when a read-only lock on a shared data object is desired, a thread identifier of an object header lock word (hereinafter "lock word") associated with the shared data object is examined to determine if a read-write lock on the shared data object already exists. If not, then the thread identifier is set to a predetermined value indicative of read-only locks, and a thread count in the lock word is incremented. If another thread attempts a read-only lock, the thread identifier will be examined for the predetermined value. If it is present, the thread count will be incremented again, and a second read-only lock will be simultaneously established. Conversely, if a read-write lock is attempted while a read-only lock exists, the read-write lock will be denied and the lock will be inflated.

Figure 1:
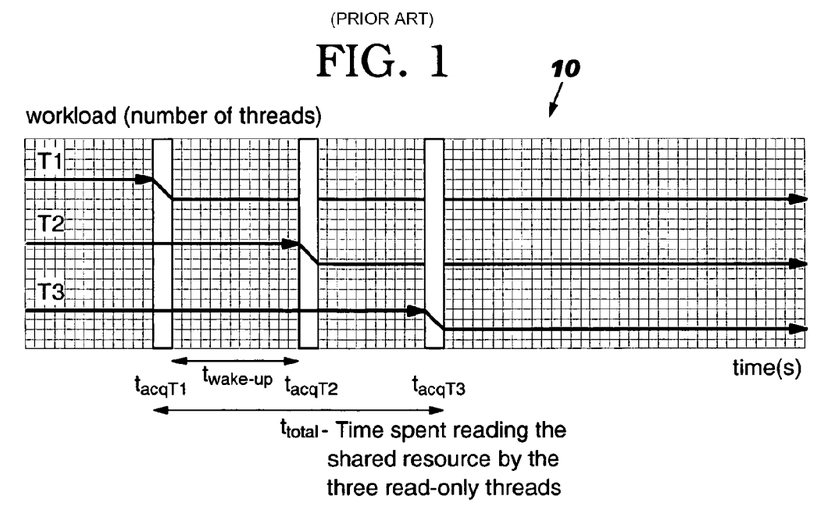
FIG. 1 depicts a standard locking scheme according to the prior art.

Referring now to FIG. 1, a typical locking scheme/primitive 10 is shown. Under scheme 10, T1, T2, and T3 represent separate threads running in the current workload, while t.sub.acqT1, t.sub.acqT2, t.sub.acqT3 are distinct time moments where the corresponding threads acquire access to the shared data resource and t.sub.wake-up is the time that the operating system spends scheduling the next thread to acquire the shared data resource, based on the operating system thread scheduler. As can be seen in FIG. 1, there are three threads that all read from a shared data structure, and thus are trying to access the resource at the same time. Because of the serializing behavior of the lock, each thread will access the shared data object in three distinct moments: t.sub.acqT1, t.sub.acqT2 and t.sub.acqT3, where there also exists a time interval t.sub.wake-up, which is the time that the operating system needs to wake up the sleeping thread and schedule the next access of the shared resource.

Figure 2:
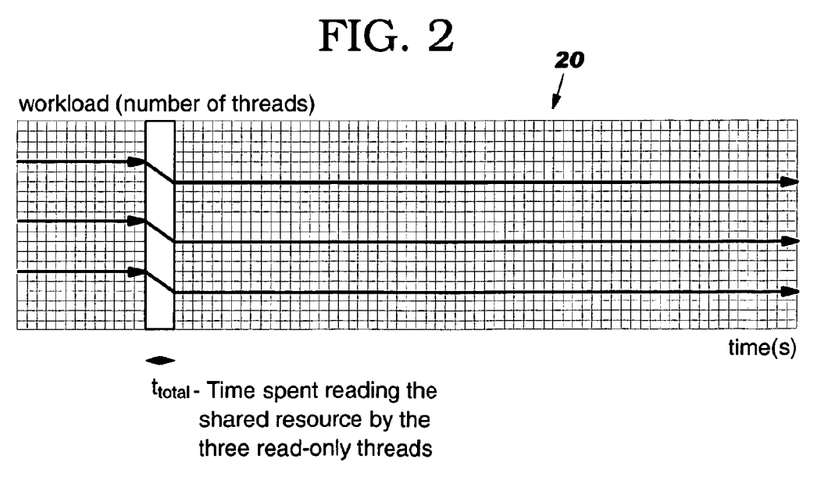
FIG. 2 depicts a locking scheme in accordance with the present invention.

Conversely, FIG. 2 depicts a locking scheme/primitive 20 according to the present invention. Specifically, FIG. 2 depicts the same threads accessing the shared resource using a multiple reader-single writer scheme (e.g., multiple read-only locks). Under scheme 20, all three threads finish executing their read operations in substantially less time. To accomplish this, the present invention describes a method to automatically transform normal locking primitives to a multiple reader-single writer scheme, when certain conditions are met (e.g., when it is safe to do so). In a typical embodiment, this is accomplished using a compiler optimization technique (e.g., a Java Just-in-Time (JIT) Compiler). The use of the present invention improves the scalability of programs, without requiring programmers to implement individually engineered logic to convert each lock to a multiple reader-single writer lock.

It should be understood in advance that although the transformations described in this disclosure are language-independent, in a typical embodiment they are applicable in an object-oriented programming language, such as Java, which is used in the examples set forth below.

In implementing the present invention, first analyze the implementation of the methods "set" and "get" in the class C of the code set forth above. Specifically, the method "set" writes to the threadSafeField and the method "get" only reads the threadSafeField value from the shared data object O, which is an illustrative shared data object herein. When the JIT compiler compiles the method "get" it can conclude that the access to the shared data object O, which is accessed through the synchronization primitive in this case, is read-only, since all the code does is to read the value from the object and return it back to the caller. In this case, the JIT compiler marks this locking primitive as "read-only." Using this information, the JIT compiler generates a modified sequence for the locking primitive, extending the functionality of the "flat locks" and allowing multiple threads to execute the "guarded" code in the same time. This extension of the locking algorithm is further described in Section II of this disclosure below.

When the transformation is performed the example class C will appear as follows:

```
class C {
    private int threadSafeField;
    public synchronized void set(int value) {
        threadSafeField = value;
    }
    public int get( ) {
        lock(read-only)
        return threadSafeField;
        unlock(read-only)
    }
}
```

As indicated above, in a typical embodiment, this transformation is performed automatically at compile time (e.g., by the JIT compiler) without any user/programmer interaction.

To be able to mark the lock as a "read-only lock, the compiler performs a field access analysis, where it will attempt to determine whether a certain set of conditions are met (e.g., that there aren't any write operations to a global data object/structure or global variable in the synchronized code region). Local write operations are allowed since local variables cannot be shared between threads. For example, the modified version of the "get" method, presented below, is also recognized as read-only synchronized access since floatValue is local to the method and to each thread that is executing it:

```
public int get( ) {
    lock(read-only)
    float floatValue = ((float)threadSafeField)/0.34f;
    if (floatValue>12.3f) {
        unlock(read-only)
        return 0;
    }
    unlock(read-only)
    return threadSafeField;
}
```

Under the present invention, the set of conditions include the following:

1. The synchronized region of code does not contain writes to any global data structures or global variables. This condition is required to prevent changing the locking characteristics of the program, even if the fields or variables are not members of the shared data object on which is being synchronizing.

2. The synchronized region of code does not contain other locks nested therein. This condition is needed to prevent recursive reader locks, which are not permitted, as explained in Section II of this disclosure.

3. The synchronized region of code must be restricted to be read-only on all control flow paths in the code.

The read-only locks have an inherent restriction in that they cannot contain other synchronized regions of code, as asserted by the 3rd condition of the read-only locks creation set forth above. The restriction is important because making certain portions of the code re-entrant by multiple threads can cause dead-locks, where they didn't exist before. For example, consider the following code regions:

Locked region of code 1:

```
monitor-enter (Object 1)
    ...
    monitor-enter (Object 2)
        ...
        monitor-enter (Object 3)
        ...
        monitor-exit (Object 3)
    ...
    monitor-exit (Object 2)
...
monitor-exit (Object 1)
```

Locked region of code 2:

```
monitor-enter (Object 1)
    ...
    monitor-enter (Object 3)
        ...
        monitor-enter (Object 2)
        ...
        monitor-exit (Object 2)
    ...
```

-continued

```
monitor-exit (Object 3)
...
monitor-exit (Object 1)
```

Note that the order of locking Object 2 and Object 3 are reversed in the two code regions. In the example above, the reversed order of locking the Objects 2 and 3 can potentially cause a dead-lock situation, but because the access to that code region is guarded by another lock (Object 1), the threads will have to serialize on that access and the dead-lock is avoided. However, the monitor-enter and monitor-exit are transformed on the Object 1 to a read-only lock, given that the code fragments above conform to conditions 1, 2, and 4 on creating read-only locks, multiple threads would be permitted to reach the monitor-enters on Objects 2 and 3. By doing this, the possible dead-lock scenario is exposed because of the reversed order of locking the Objects 2 and 3. The restriction is still needed even if all of the locks are transformed as read-only, since the locks on the Objects 2 and 3 can eventually become inflated, if another read-write thread locked the objects in different code region.

II. Illustrative Example

To support multiple read-only locks in accordance with the present invention, the standard locking approach is extended. In this section the features needed to meet the demands of the read-only locks, generated by the JIT compiler using the analysis indicated in Section I of this document, are described.

The low-level implementation of the read-only locks works on top of the standard "flat" locking scheme, where the existing lock word inside the object header is used to mark the new special states that the lock can have when it behaves as read-only lock.

Figure 3:
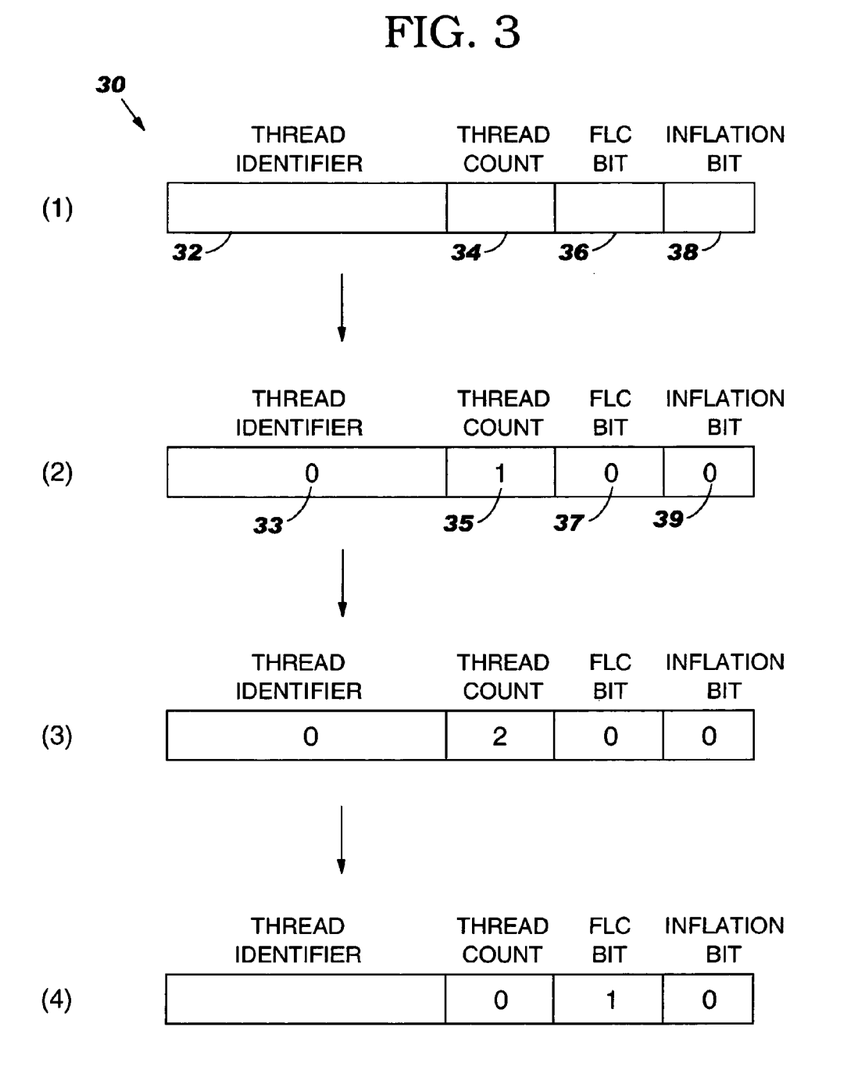
FIG. 3 depicts a lock word according to the present invention at various states.

Referring to FIG. 3, an illustrative lock word 30 in accordance with the present invention is shown at various states (1-4). As shown, lock word 30 includes a thread identifier field 32 for indicating a thread identifier 33, a thread count field 34 for indicating a thread count 35, a flat lock contention (FLC) field 36 for indicating a flat lock contention (FLC) bit 76 and an inflation field 38 for indicating an inflation bit 39. Under the present invention, a special thread identifier is used to represent that the lock is currently held by a reader lock (e.g., a predetermined value indicative of read-only locks). While a thread holds the lock, multiple simultaneous access of other read-only threads are allowed, but any thread requesting exclusive access to the lock will block, and inflate the lock properly. For this purpose an illustrative thread identifier of zero is chosen as the predetermined value for all bits (e.g., 22 bits) of the thread identifier field of the lock word.

Under the present invention, when a first thread T1 attempts to obtain a read-only lock on a shared data object associated with lock word 30, thread identifier 33 is examined to determine: (1) if it is "reset" indicating no locks have yet been established; (2) if it is set to the predetermined value (e.g., zero) indicative of read-only locks; or (3) if it is set to some other value indicative of a read-write lock For this example, assume that no previous locks have been established on the shared data object, and that lock word 30 appears as shown in state 1. In this case, thread T1 will establish a read-only lock, thread identifier 33 will be set to the predetermined value (e.g., zero) and thread count 35 will be incremented. The results of these steps are shown in state 2 (it should be understood that the value of zero as thread identifier 33 has been shown as a single bit for brevity purposes).

Further assume that some time thereafter, a second thread T2 attempts to acquire a read-only lock on the shared data object. In this case, the same examination of thread identifier 33 will be performed. This time, the result will be that the thread identifier 33 is set to the predetermined value indicating the presence of a read-only lock. The same conclusion could be reached by examining thread count 35 and recognizing a non-zero value. Since thread T2 wishes to acquire a read-only lock, it will be permitted and thread count will be incremented once again. The results of this operation are shown in state 3. This process can continue for N number of read-only locks. In such a case, thread count 35 will be incremented to value N.

Now assume that after the read-only locks have been established a third thread T attempts to acquire a read-write lock on the same shared data object. In this case, the examination of thread count 35 will reveal a non-zero value indicating that at least one read-only lock currently exists on the shared data object. Moreover, an examination of threads identifier 33 will reveal its setting to the predetermined value indicating the presence of at least one read-only lock. Thus, the read-write lock attempted by thread T3 will be denied. At this point thread T3 can inflate the lock to deal with the contention (e.g., by setting FLC bit 37) so that lock word 30 can appear as shown in state 4. However, if thread T3 had already established a read-write lock before threads T1 and T2 attempted to establish their read-only locks, the read-only locks would be blocked because the examination of the thread identifier 33 would reveal a value other than the predetermined value (e.g., a value other than zero). In such a case, thread T1 would inflate the lock.

In any event, as threads T1 and T2 exit their respective locks, they will decrement thread count 35 accordingly. For example, if thread T1 first releases its lock, thread count 35 will be decremented to a value of 1. When thread T2 later releases its lock, the thread count 35 will be further decremented to a value of zero (i.e., a value of zero assuming no other threads have acquired a read-only lock and incremented the counter in the meantime). The last thread to release its read-only lock will check the state of FLC bit 37 to see if the lock needs to be inflated. FLC bit 37 also serves as a guard to prevent more read-only threads from entering the synchronized region to ensure lock fairness in case a read-write thread has requested entry to the synchronized region.

In summary, according to the modified locking mechanism of the present invention, when a thread tries to enter a synchronized region of code which is marked as read-only, it will keep thread identifier 33 intact (e.g. at 0) while updating thread count 35 by one. If another thread attempts to enter a read-only synchronized region of the same object it will similarly increase thread count 35 and continue. On the other hand, if a thread attempts to enter a read-write synchronized region guarded by the same object lock, it will block because the thread count 35 will be non-zero and the thread will inflate the lock, to deal correctly with the contention. In the same manner, if a read-write lock is already written into lock word 30, the read-only lock will fail to apply the read-only scheme because the thread identifier field will not be zero and it will inflate the lock. On exit, each reader thread will decrement the lock count and check if it is the last one exiting from the synchronized region, where, if it is the last one it checks the FLC bit to see if the lock needs to be inflated.

In the above example, assume that the Operating System will not create a thread identifier 33 less than the value "4" so that more bits can be used in lock word 30 to represent how many threads are currently inside the locked region. As in the example above two extra bits are used. However, it should be appreciated that more than two extra bits could easily be used depending on the operating system threading implementation.

The changes to the low-level implementation of the read-only locks are transparent to the virtual machine and do not require changes to the "inflated" locks implementation; only the code generated by the JIT compiler at entry and exit to synchronized regions are affected. The pseudo-code below represents the modified reader-lock monitor-enter and monitor-exit algorithms of the present invention:

```
Read-only lock "monitor-enter":
    SET Acquired = false
    IF FLC == 1 OR INF == 0 THEN
        GOTO virtual machine contended monitor-enter lock path
    ENDIF
    IF SharedResource->ThreadID == 0 THEN
        Try atomic increment of the SharedResource->ThreadCount
        in the shared
        resource (object) header word
        IF increment succeeded AND
                SharedResource->ThreadCount < 256
            SET Acquired = TRUE
        ENDIF
    ELSE
        Attempt flat lock acquisition
    ENDIF
    IF NOT Acquired
        SET FLC = 1
        GOTO virtual machine contended monitor-enter lock path
    ENDIF
Read-only lock "monitor-exit":
    SET SharedResource->ThreadCount =
            SharedResource->ThreadCount - 1
    IF SharedResource->ThreadCount = 0
        IF FLC == 1 THEN
            SET INF = 1
            SET SharedResource->ThreadID =
            SystemMonitorAddress
            GOTO virtual machine contended monitor-exit path
        ENDIF
        IF INF == 1 THEN
            GOTO virtual machine contended monitor-exit path
        ENDIF
    ENDIF
```

III. Computerized Implementation

Figure 4:
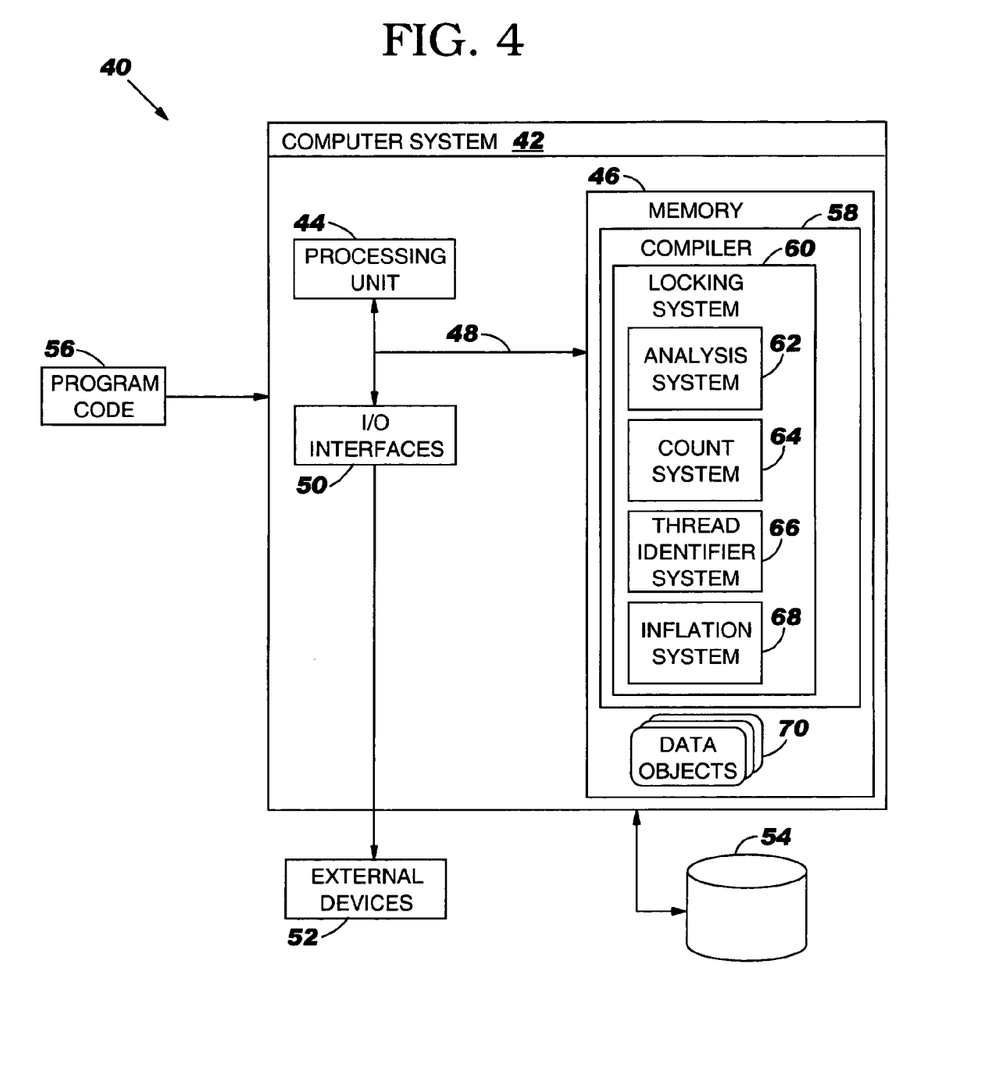
FIG. 4 depicts a computerized implementation of the present invention.

Referring now to FIG. 4, an illustrative system 40 for permitting/establishing multiple read-only locks (simultaneously) on a shared data object 70 is shown. Specifically, system 40 includes a computer system 42, which could be part of a larger computer infrastructure or environment. In addition, computer system 42 should be understood to be any type of computerized device capable of carrying out the teachings of the present invention. For example, computer system 12 can be a desktop computer, a laptop computer, a hand held device, a client, a server, etc.

The teachings of the present invention can be implemented via a stand-alone system as shown, or over a network such as the Internet, a local area network (LAN), a wide area network (WAN), a virtual private network (VPN), etc. In the case of the latter, communication throughout the network could occur via a direct hard-wired connection (e.g., serial port), or via an addressable connection that may utilize any combination of wireline and/or wireless transmission methods. Conventional network connectivity, such as Token Ring, Ethernet, WiFi or other conventional communications standards, could be used. Still yet, connectivity could be provided by conventional IP-based protocol. In this instance, an Internet service provider could be used to establish interconnectivity.

As further shown, computer system 42 generally includes processing unit 44, memory 46, bus 48, input/output (I/O) interfaces 50, external devices/resources 52 and storage unit 54. Processing unit 44 may comprise a single processing unit, or be distributed across one or more processing units in one or more locations, e.g., on a client and server. Memory 46 may comprise any known type of data storage and/or transmission media, including magnetic media, optical media, random access memory (RAM), read-only memory (ROM), a data cache, a data object, etc. Moreover, similar to processing unit 44, memory 46 may reside at a single physical location, comprising one or more types of data storage, or be distributed across a plurality of physical systems in various forms.

I/O interfaces 50 may comprise any system for exchanging information to/from an external source. External devices/resources 52 may comprise any known type of external device, including speakers, a CRT, LED screen, hand-held device, keyboard, mouse, voice recognition system, speech output system, printer, monitor/display, facsimile, pager, etc. Bus 48 provides a communication link between each of the components in computer system 42 and likewise may comprise any known type of transmission link, including electrical, optical, wireless, etc.

Storage unit 54 can be any system (e.g., a database, etc.) capable of providing storage for information under the present invention. As such, storage unit 54 could include one or more storage devices, such as a magnetic disk drive or an optical disk drive. In another embodiment, storage unit 54 includes data distributed across, for example, a local area network (LAN), wide area network (WAN) or a storage area network (SAN) (not shown). Although not shown, additional components, such as cache memory, communication systems, system software, etc., may be incorporated into computer system 42.

Shown in memory 46 of computer system 42 as program code is locking system 60 shown within compiler (e.g., a JIT compiler) 58. It should be understood that the implementation of the present invention within compiler 58 is only one way of carrying out the teachings thereof. Regardless, it should be understood that computer system 42 could contain other components not shown in FIG. 4. Such components could include, for example, an Operating System (OS) that could be constituted by a kernel area and a user area, and can include an Application Programming Interface (API). The OS could also include a thread library that has a function for enabling an operation performed between the hardware of computer system 42, and locking system 60. The thread library also typically provides a function for queue locking. If a database language is employed, a database management system may be provided above the OS, and a database application program may be executed by the system. When the Java language is employed, a JVM may be provided above the OS, and an applet or Java application may be executed by JVM. The execution of the applet or Java application can be performed by multi-threads. For the Java language, the monitor function and the locking and unlocking function may be installed in the JVM. Further, the JVM may be implemented as a part of the OS.

Components such as these are more specifically shown and described in the U.S. application Ser. No. 10/890,751 filed Jul. 14, 2004, issued as U.S. Pat. No. 7,447,861 on Nov. 4, 2008 and entitled Integrated Multi-function Object Locks, herein incorporated by reference.

As depicted, locking system 60 includes analysis system 62, count system 64, thread identifier system 66 and inflation system 68. As program code 56 is being compiled (e.g., by compiler 58), locking system 60 will provide the above described functionality to permit multiple threads to simultaneously establish read-only locks on a shared data object 70. Following the above example from Section II, assume that as program code 56 is being compiled, thread T1 attempts to establish a read-only lock on shared data object 70. In such a case, analysis system 62 will perform the field access analysis to make sure that the above-mentioned set of conditions is met. For example, analysis system 62 will examine/analyze the thread identifier and/or thread count of the lock word associated with shared data object 70. This will reveal whether: (1) no locks are currently in place; (2) another read-only lock is currently in place; or (3) a read-write is currently in place on shared data object 70. If no locks are in place, or if another read-only lock is in place, thread T1 will be permitted to establish its read-only lock on shared data object 70. Assume now that no other locks were in place, and that a read-only lock is successfully established by thread T1. In this case, count system 64 will increment the thread count in the lock word, and thread identifier system 66 will set the thread identifier to the predetermined value indicative of read-only locks (e.g., zero).

If another thread T2 attempts to establish a read-only lock on the same shared data object, analysis system 62 will reveal the existing read-only lock held by thread T1 (e.g., based on the thread identifier and/or thread count). In this case, thread T2 will be permitted to establish a second read-only lock on the shared data object 70 at which time count system 66 will increment the thread count once again. Now assume that thread T3, attempts to establish a read-write lock on the shared data object 70. When this is attempted, analysis system 62 will examine the lock word and, based on the thread count and/or threads identifier, reveal that read-only locks currently exist on the shared data object 70. This will case the read-write lock attempted by thread T3 to be blocked, at which time inflation system 68 will inflate the lock (e.g., by setting the FLC bit in the lock word) to deal with the contention. Inflation system 68 will function similarly if a thread attempts to establish a read-only lock on shared data object 70 when a read-write lock is already in place.

In any event, as threads T1 and T2 release their respective read-only locks on the shared data object 70, count system 64 will decrement the thread count. The last thread to release its lock (e.g., as denoted by the thread count being 1 just prior to its release) will check to FLC bit to see if inflation and contention need to be handled.

It should be appreciated that the present invention could be offered as a business method on a subscription or fee basis. For example, computer system 42 and/or locking system 60 of FIG. 4 could be created, supported, maintained and/or deployed by a service provider that offers the functions described herein for customers. That is, a service provider could offer to implement a multiple read lock scheme for customers.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A computer-implemented method for automatically transforming a locking primitive for a shared data object to permit multiple synchronized threads of a program to simultaneously hold read-only locks on the shared data object, comprising:

performing a field access analysis on a lock word of the locking primitive for the shared data object in a header of the shared data object to determine whether a predetermined set of conditions are met, wherein the predetermined set of conditions indicate the shared data object is available to be locked by multiple read-only threads;

when the set of predetermined conditions are met, automatically transforming the locking primitive for the shared data object by setting a thread identifier field of the lock word to a predetermined value, the predetermined value not being a thread identifier and indicating that additional threads are allowed to simultaneously hold a read-only lock on the shared data object; and incrementing a thread count in a thread count field of the lock work for each read-only lock simultaneously obtained on the shared data object, wherein a read-write lock on the shared data object is not permitted while a read-only lock exists.

2. The computer-implemented method of claim 1, further comprising setting a fat lock contention (FLC) bit in an FLC field of the lock word pursuant to an attempt by a thread to establish the read-write lock on the shared data object subsequent to setting the thread identifier to the preselected value and incrementing the thread count.

3. The computer-implemented method of claim 1, wherein the method is carried out at compile time of program code associated with the shared data object.

4. The computer-implemented method of claim 1, wherein the predetermined set of conditions includes a lack of a write command to global data objects or global variables in a synchronized region of program code associated with locking the shared data object.

5. The computer-implemented method of claim 1, wherein the predetermined set of conditions includes a lack of nested locks in a synchronized region of program code associated with locking the shared data object.

6. The computer-implemented method of claim 1, wherein the predetermined set of conditions includes a read-only restriction for a synchronized region of program code associated with locking the shared data object.

7. A computer-implemented method for establishing multiple read-only locks on a shared data object by multiple synchronized threads of a program, comprising:

providing a lock word for the shared data object in an object header of the shared data object that includes a thread identifier field, a thread count field, flat lock contention field and a lock inflation field;

examining the thread identifier field to determine if a read-write lock currently exists on the shared data object pursuant to an attempt by a first thread to obtain a read-only lock on the shared data object, wherein the thread identifier field will contain a value indicating there is a read-write lock on the shared data object when a read-write lock currently exists on the shared data object;

incrementing a thread count in the thread count field to establish a first read-only lock on the shared data object by the first thread if the read-write lock has not been established, and wherein a read-write lock on the shared data object is not permitted while a read-only lock exists; and setting a thread identifier in the thread identifier field to a predetermined value indicative of read-only locks by a thread establishing the read-only lock, the predetermined value not being a thread identifier, wherein the presence of the predetermined value in the thread identifier field indicates additional threads can simultaneously establish read-only locks on the shared data object.

8. The computer-implemented method of claim 7, further comprising:

examining the thread identifier field to determine if the read-write lock currently exists on the shared data object pursuant to an attempt by a second thread to simultaneously obtain a second read-only lock on the shared data object; and incrementing the thread count to simultaneously establish the second read-only lock if the read-write lock has not been established.

9. The computer-implemented method of claim 7, further comprising examining the thread identifier field to determine if the read-only lock currently exists on the shared data object, as indicated by the presence of the predetermined value in the thread identifier field, pursuant to an attempt by a second thread to simultaneously obtain a second read-only lock on the shared data object; and incrementing the thread count to simultaneously establish the second read-only lock upon detecting the presence of the predetermined value in the thread identifier field.

10. The computer-implemented method of claim 7, wherein the predetermined value comprises zero.

11. The computer-implemented method of claim 7, further comprising setting a fat lock contention (FLC) bit in an FLC field of the lock word pursuant to an attempt by a third thread to establish the read-write lock on the shared data object.

12. The computer-implemented method of claim 7, further comprising:

decrementing the thread count pursuant to a release of the second read-only lock by the second thread; and decrementing the thread count pursuant to a release of the first read-only lock by the first thread.

13. A computerized system implemented in hardware, the hardware programmed to execute instruction code for establishing multiple read-only locks by synchronized threads of a program on a shared data object, comprising:

an analysis system established by the computerized system for examining a thread identifier in a thread identifier field of a lock word associated with the shared data object in a header of the shared data object to determine if a read-write lock currently exists on the shared data object pursuant to an attempt by a first thread to obtain a read-only lock on the shared data object, wherein the thread identifier field will contain a value indicating there is a read-write lock on the shared data object when a read-write lock currently exists on the shared data object;

a count system established by the computerized system for incrementing a thread count in a thread count field of the lock word to establish a first read-only lock on the shared data object by the first thread if the read-write lock has not been established, wherein a read-write lock on the shared data object is not permitted while a read-only lock exists; and a thread identifier system established by the computerized system for setting a thread identifier in the thread identifier field to a predetermined value indicative of read-only locks, the predetermined value not being a thread identifier, wherein the presence of the predetermined value in the thread identifier field indicates additional threads can simultaneously establish read-only locks on the shared data object.

14. The computerized system of claim 13, wherein the analysis system further examines the thread identifier field to check for the predetermined value pursuant to an attempt by a second thread to simultaneously obtain a second read-only lock on the shared data object, and wherein the count system further increments the thread count to simultaneously establish the second read-only lock if the predetermined value is present.

15. The computerized system of claim 13, wherein the predetermined value comprises zero.

16. The computerized system of claim 13, further comprising an inflation system for setting an inflation bit in an inflation field of the lock word pursuant to an attempt by a third thread to establish the read-write lock on the shared data object.

17. The computerized system of claim 13, wherein the count system further decrements the thread count for each release of the second read-only lock and the first read-only lock.

18. A computer program product stored on a recordable medium for establishing multiple read-only locks by synchronized threads of a program on a shared data object, which when executed, comprises:

program code for examining a thread identifier in a thread identifier field of a lock word associated with the shared data object in a header of the shared data object to determine if a read-write lock currently exists on the shared data object pursuant to an attempt by a first thread to obtain a read-only lock on the shared data object, wherein the thread identifier field will contain a value indicating there is a read-write lock on the shared data object when a read-write lock currently exists on the shared data object;

program code for incrementing a thread count in a thread count field of the lock word to establish a first read-only lock on the shared data object by the first thread if the read-write lock has not been established, wherein a read-write lock on the shared data object is not permitted while a read-only lock exists; and program code for setting a thread identifier in the thread identifier field to a predetermined value indicative of read-only locks, the predetermined value not being a thread identifier, wherein the presence of the predetermined value in the thread identifier field indicates additional threads can simultaneously establish read-only locks on the shared data object.

19. The program product of claim 18, wherein the program code for examining further examines the thread identifier field to check for the predetermined value pursuant to an attempt by a second thread to simultaneously obtain a second read-only lock on the shared data object, and wherein the program code for incrementing further increments the thread count to simultaneously establish the second read-only lock if the predetermined value is present.

20. The program product of claim 18, wherein the predetermined value comprises zero.

21. The program product of claim 18, further comprising program code for setting an inflation bit in an inflation field of the lock word pursuant to an attempt by a third thread to establish the read-write lock on the shared data object.

22. The program product of claim 20, further comprising program code for decrementing the thread count for each release of the second read-only lock and the first read-only lock.

23. A method for deploying an application for establishing multiple read-only locks by synchronized threads of a program on a shared data object, comprising:
   providing a computer infrastructure being operable to:
      examine a thread identifier in a thread identifier field of a lock word associated with the shared data object in a header of the shared data object to determine if a read-write lock currently exists on the shared data object pursuant to an attempt by a first thread to obtain a read-only lock on the shared data object, wherein the thread identifier field will contain a value indicating there is a read-write lock on the shared data object when a read-write lock currently exists on the shared data object;
      increment a thread count in a thread count field of the lock word to establish a first read-only lock on the shared data object by the first thread if the read-write lock has not been established, wherein a read-write lock on the shared data object is not permitted while a read-only lock exists; and
      set a thread identifier in the thread identifier field to a predetermined value indicative of read-only locks, the predetermined value not being a thread identifier, wherein the presence of the predetermined value in the thread identifier field indicates additional threads can simultaneously establish read-only locks on the shared data object.

24. The method of claim 23, wherein the computer infrastructure is further operable to examine the thread identifier field to check for the predetermined value pursuant to an attempt by a second thread to simultaneously obtain a second read-only lock on the shared data object, and further increment the thread count to simultaneously establish the second read-only lock if the predetermined value is present.

* * * * *